H. Kellogg.
Forming Bats.

No. 62037

Patented. Feb. 12. 1867.

WITNESSES
John H. Shumway
A. J. Tibbits

Henry Kellogg
INVENTOR.
BY HIS ATTORNEY
John E. Earle

UNITED STATES PATENT OFFICE.

HENRY KELLOGG, OF NEW HAVEN, CONNECTICUT.

IMPROVEMENT IN THE MANUFACTURE OF HATS.

Specification forming part of Letters Patent No. 62,037, dated February 12, 1867.

*To all whom it may concern:*

Be it known that I, HENRY KELLOGG, of New Haven, in the county of New Haven and State of Connecticut, have invented a new Improvement in the Manufacture of Hats; and I do hereby declare the following, when taken in connection with the accompanying drawings and the letters of reference marked thereon, to be a full, clear, and exact description of the same, and which said drawings constitute part of this specification, and represent, in—

Figure 1:
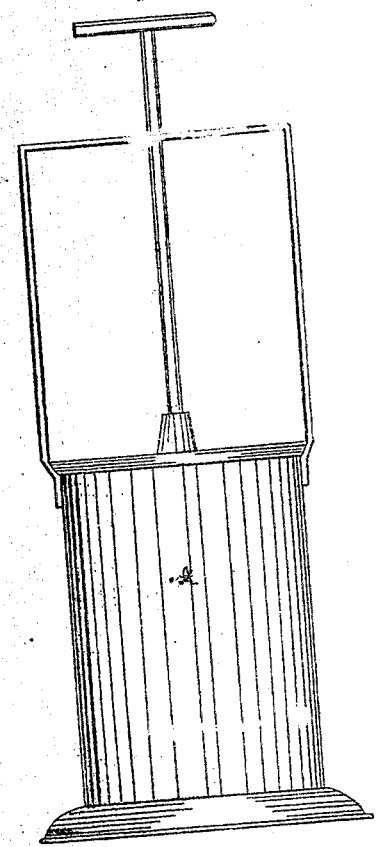
Figure 2:
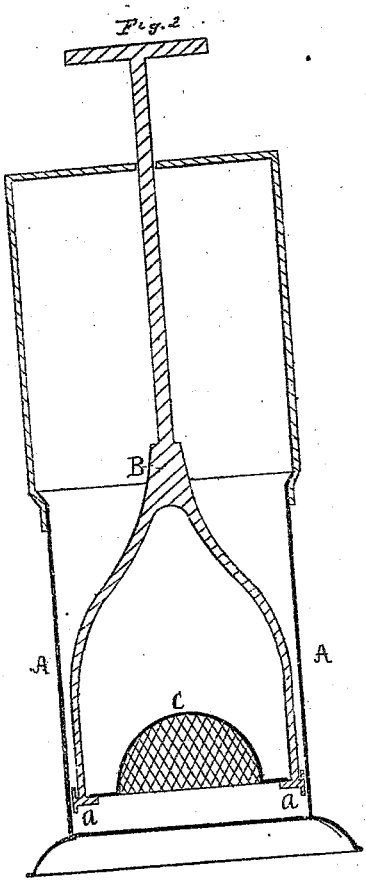

Figure 1, a side view, and in Fig. 2 a vertical central section, of the apparatus which I employ in my process of manufacture.

My invention relates to a peculiar formation of or coating hat-bodies; and consists in taking vegetable pulp, whether perfectly dry or in the partially-fluid condition in which it is usually employed for commencing to form it into sheets of paper in paper-making machines, and then mixing the same with a sufficient quantity of water—say, in the proportion of fifty to eighty parts, or thereabout, of water to one of pulp—in order to entirely separate the fibers from each other, that they may all be diffused through the water similarly to the manner in which particles or motes float in the air, then introducing into the same animal fiber, such as wool, and from this mixture forming a hat-body by placing the mixture into a vessel above a former, constructed from perforated metal, or other suitable permeable material, constantly agitating the mixture to preserve the above-stated condition; then, by suction from below or pressure above, forcing the water through the former, leaving the fibrous mixture thoroughly mingled, and packed in sufficient quantity to form the body; and that others skilled in the art may be enabled to thus produce hat-bodies, I will proceed to describe my manner of so doing, employing the apparatus illustrated in the accompanying drawings.

The apparatus which I employ and illustrate is that for which I have applied for Letters Patent, and of even date herewith.

I first prepare a pulp from any vegetable pulping substance, in the usual manner, as for the manufacture of paper, and after reducing this to a very liquid state by the introduction of water in about fifty to eighty times the quantity used for the manufacture of paper, as above stated, I introduce an animal fiber, preferring wool, equal in quantity, say, of about five to one of pulp. This fiber I thoroughly intermix with the above, and thus prepared the mixture is ready for use for the formation of the hat.

The apparatus, which is fully described in my application for patent aforesaid, consists of a cylinder, A, provided with a plunger-ring, $a$, which fits closely in the cylinder, and is moved up or down therein by a handle, B. On the plunger-ring I place a hat-former, C. This should be the form of the hat required to be produced, and is made of woven wire, or may be of metal finely perforated, and so that but little of the metal will remain. This former is raised with the plunger-ring.

To form a body entire, I pour the thoroughly-mixed compound, before described, into the cylinder above the former C, then slowly, but steadily, raise the plunger, which would, were it not for the perforations in the former, create a vacuum below; but the water passes through the perforations, which are so small that the mixed compound does not pass through; therefore the mixture remains above, and is closely packed upon the former, the mixture following the current formed by the passage of the water through the former to different parts of the body until it is completely and evenly covered. I thus continue to raise the former, and continue agitation of the mixture to prevent separation, until the body is drawn entirely from the water—that is, until the water has all passed below, continuing the upward movement of the hat. Air will pass down through it to supply the space formed by the ascending body, the tendency of which is to press the water from and dry the body. The extent of this drying depends upon the length of the cylinder, which may be sufficient to completely dry the body; if not made long enough to dry the body, remove the body from the former, and dry it in any convenient or known manner. The body is then complete, and ready to receive the finishing operations of lining, binding, &c.

I find the best and most successful manner of removing the hat from the former to be to suddenly reverse the plunger, giving it a quick, downward movement, the air from below forcing the body from the former.

The objects of introducing the animal fiber are, first, that without this fiber the perforations in the former must necessarily be very fine in order to prevent the vegetable fiber from passing through, and, being so fine, this vegetable fiber packs so solidly upon the former that the water will not pass through it. Therefore the fiber falls upon the former, and remains in masses solidly and most unevenly packed thereon.

By the introduction of the animal fiber the particles of vegetable fiber are held in suspension, as it were, the fiber more readily following the currents in the water, and leading the mixed fiber to those portions of the body where the water most freely passes until the whole is evenly covered.

The animal fiber, after the body is formed, serves to very much strengthen the body by uniting the particles in like manner as the hair used in plastering mortar unites the particles of lime and sand, and, as in plastering, without the hair it could only be used in very thin coats, and possesses but very little strength. So in forming my hat-body without the animal fiber the body must be very thin, and of comparatively little strength.

I have described my invention thus far as forming the body entire; but the same process may be employed to coat a body formed of "foundation" or similar material. To do this, place the foundation-body upon the former, and operate, as described, for forming the hat-body. This last class of hats may be coated only upon side, or, after one side has been coated, the former may be reversed, and the other side be coated in like manner.

By the mechanism which I have described for my process the natural pressure of the atmosphere is all that I employ, and practically all that is required; yet the process may be facilitated by increasing the pressure either upon the mixture above the former or by suction from below.

I am well aware that hats and articles of various forms have been made from pulp, as in the English patent of Brown and Mackintosh, May 22, 1852; but in this it will be observed that pulp only is used, and there is no appearance of animal fiber mixed with the pulp.

In the English provisional specification of John Campbell Evans, of January, 1864, for improvement in the manufacture of coverings for the head, the same may be said; for he says the manufacture is "from pulp, of the description ordinarily employed in the manufacture of paper, or of pulp composed of shoddy, or of refuse silk or cotton, or other suitable pulping material." Here, too, it will be observed that no material is used that is not capable of being pulped, and after it has been pulped no other material is introduced. Animal fiber, it is well known, cannot be pulped.

I do not wish to be understood, therefore, as claiming a hat formed from pulp alone; but Having fully described my invention, what I do claim as new and useful, and desire to secure by Letters Patent, is—

A hat formed and constructed by combining animal fiber with vegetable pulped fiber, substantially as herein set forth and described.

HENRY KELLOGG.

Witnesses:
JOHN E. EARLE,
N. W. H. GILBERT.